Patented Aug. 24, 1943

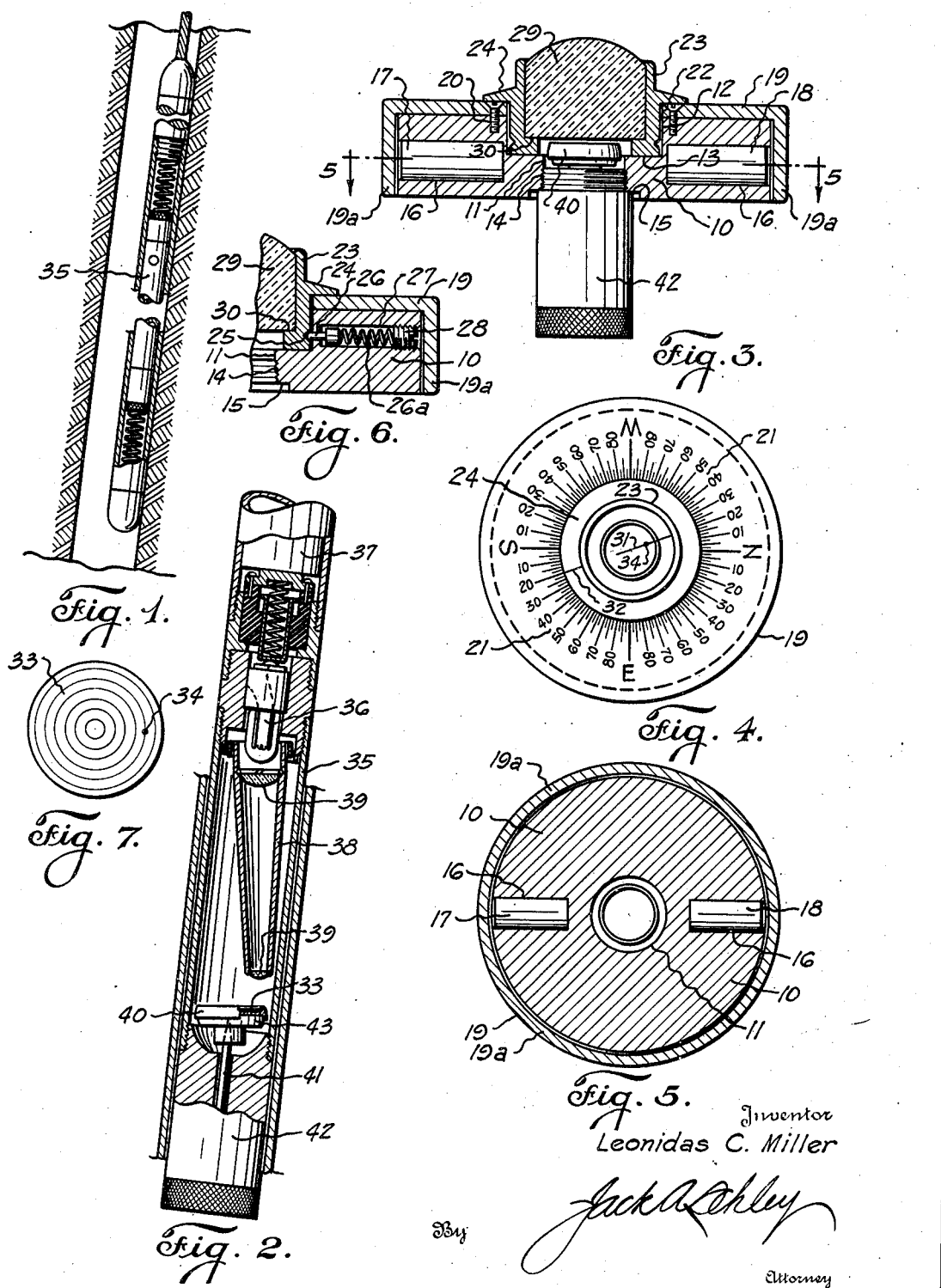

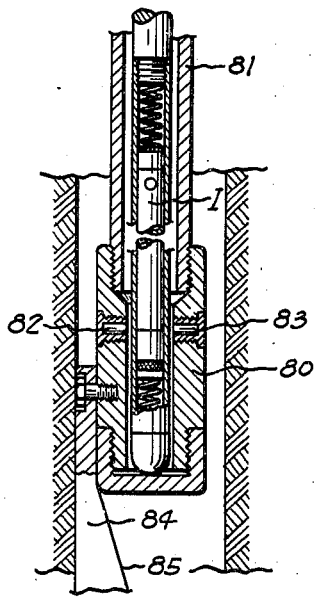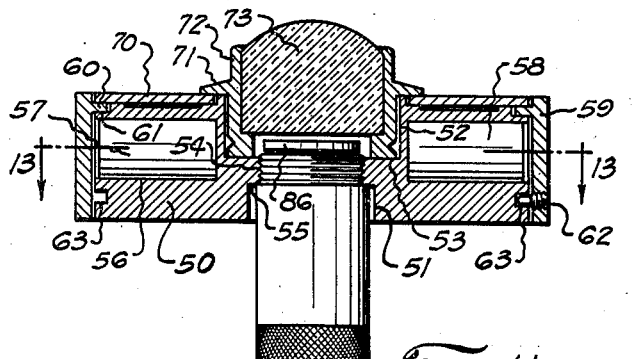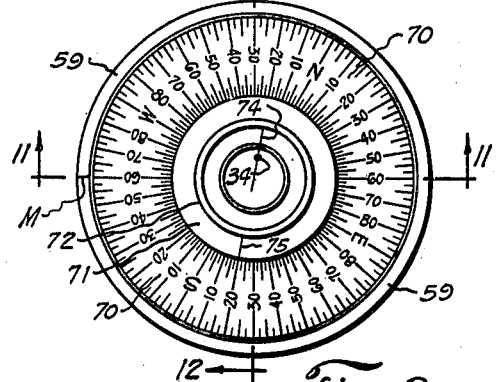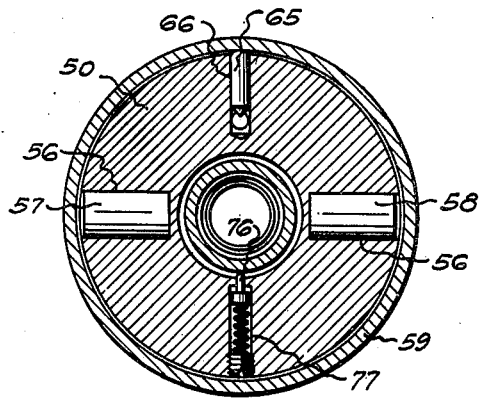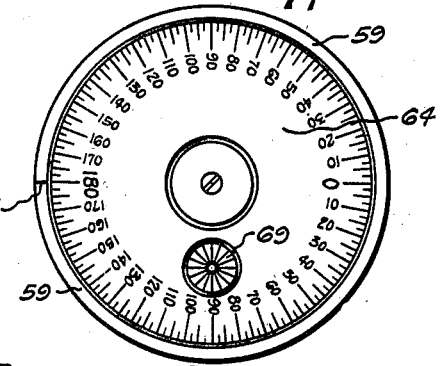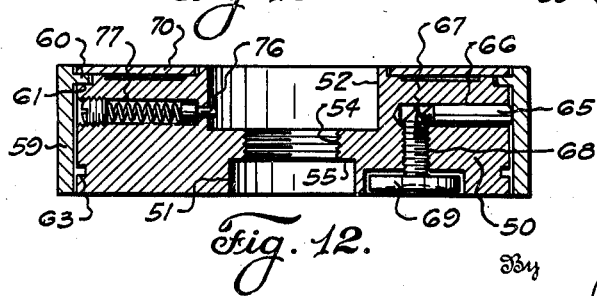

2,327,659

UNITED STATES PATENT OFFICE 2,327,659

READING INSTRUMENT

Leonidas C. Miller, Dallas, Tex., assignor of one-half to Eastman Oil Well Survey Company, Dallas, Tex., a corporation of Delaware, and one-half to Eastman Oil Well Survey Corporation, Long Beach, Calif., a corporation of California Application June 1, 1940, Serial No. 338,444

13 Claims. (Cl. 33—1)

This invention relates to new and useful improvements in reading instruments.

One object of the invention is to provide an improved instrument or device which is adapted for use with well survey methods and with tool orienting methods, whereby an instantaneous and accurate determination of the direction and inclination of the well bore or of the azimuthal position of a tool in said bore may be obtained.

An important object of the invention is to provide an improved reading or indicating device for determining the azimuthal position of indicia which has been made on an indicating medium within a well bore and which indicia are representative of the low side of the bore; said instrument having means for correlating the indicia with azimuthal north, whereby the exact azimuthal position, in degrees, of the low side of the bore, is visibly indicated by said device and accurate information as to the direction and inclination of said bore, as well as the position of the tools in said bore, is obtained.

A particular object of the invention is to provide an improved device, of the character described, wherein an indicating element on which indicating indicia have been formed within a well bore, is caused to assume the same relative position within the device as it had occupied within the bore, whereby the indication on the element may be readily calculated with respect to a point on said instrument which is representative of azimuthal north, thereby permitting valuable information as to the disposition of the well bore, or of tools therein, to be obtained.

Another object of the invention is to provide an improved instrument, of the character described, for determining and indicating the information shown by an indicating medium which information has been secured within the well bore, whereby such information may be obtained without the necessity of employing a photographic film or record, which requires development; the instrument not only reducing expense and facilitating carrying out of the well survey but also making for a substantially instantaneous and accurate reading of said medium.

Still another object of the invention is to provide an improved device of the character described, which is so constructed that its elements are representative of the elements with which the indicating medium is associated in the well bore, whereby when said medium is placed within the device, its relative position in the well bore is, in effect, reproduced, whereby a direct reading or indication of the information shown on said medium may be obtained.

A further object of the invention is to provide an improved reading instrument having a magnet therein which is adapted to be used for translating or interpreting the indications shown on an indicating medium, which medium is made in the well bore and is controlled in its position in the bore by a magnetic influence, either the magnetic influence of the earth or the influence of a magnet which is mounted in the instrument within which the medium is disposed.

A construction designed to carry out the invention will be hereinafter described, together with other features of the invention.

The invention will be more readily understood from a reading of the following specification and by reference to the accompanying drawings, in which an example of the invention is shown, and wherein:

Figure 1 is a sectional view of a portion of a well bore, showing an instrument which is used for making the indication lowered therein, Figure 2 is an enlarged sectional view of the instrument, illustrating the mounting of the indicating medium, Figure 3 is a transverse, vertical sectional view of a reading instrument, constructed in accordance with the invention, with an indicating medium employed in making well surveys disposed therein, Figure 4 is a plan view of the instrument, Figure 5 is a horizontal, cross-sectional view, taken on the line 5—5 of Figure 3, Figure 6 is a sectional detail showing the retaining means for the rotatable dial, Figure 7 is a plan view of the indicating disk which is insertable within the instrument, Figure 8 is a transverse, sectional view of another type of instrument which is used for orienting tools in the well bore, Figure 9 is a plan view of a modified form of reading instrument which is employed with the indication made in orienting well tools, the indicating medium being mounted therein, Figure 10 is a bottom view of the instrument, Figure 11 is a transverse, vertical, sectional view, taken on the line 11—11 of Figure 9, Figure 12 is a transverse, vertical, sectional view, taken on the line 12—12 of Figure 9, and Figure 13 is a horizontal, cross-sectional view, taken on the line 13—13 of Figure 11.

In the drawings, the numeral 10 designates a circular block or body which is formed with an axial opening 11. The upper end of the opening is counter-bored or enlarged at 12, whereby an internal annular shoulder 13 is formed within the body. Below the shoulder 13, the opening is provided with screw threads 14 and immediately below said threads, the opening is enlarged to form a smaller shoulder 15. The body 10 has a pair of diametrically opposed cavities or recesses 16 and magnetic elements 17 and 18 are insertable within these recesses. The magnetic elements are located on opposite sides of the block 10 in opposed relation and are in horizontal alinement with the internal shoulder 13 which is provided within the block. The magnetic element 17 is representative of the point south, while the magnetic element 18 is representative of the point north of the compass.

The block 10 is disposed within a flanged case or housing 19 which is rigidly secured to the block by suitable screws 20. As is clearly shown in Figure 3, the flanges 19a of the case or housing are coextensive with the peripheral portion of the circular block 10 and serve to prevent outward displacement of the magnetic elements 17 and 18 from their respective recesses 16. The upper surface of the case or housing 19 has a dial 21 displayed thereon and this dial is marked off in degrees and has the points of the compass thereon. The point north of the dial 21 is located immediately above, or in vertical alinement with the magnetic element 18, which is representative of azimuthal north, while the point south of the compass is vertically alined with the other magnetic element 17 which is representative of azimuthal south.

The case or housing 19 is formed with a central opening 22 which is of substantially of the same diameter as the counterbore or enlarged upper end 12 of the opening 11 in the block 10, whereby when the case is in position over the block, the opening 22 forms a continuation of the counterbore 12. A flanged collar 23 is rotatably mounted within the opening 22 and the counterbore 12, with the annular flange 24 of said collar overlying the case or housing 19. As is clearly shown in Figure 6, the collar 23 has an annular groove 25 formed in its peripheral portion at the lower end thereof. A spring-pressed pin 26, which is mounted within a radially extending passage 27 in the block 10 has its inner end engaging the annular groove 25 so as to prevent upward displacement of the rotatable collar 23 from the counterbore 12. The pin 26, together with its spring 26a, is maintained within the passage by means of a retaining screw 28. Manifestly, with this arrangement, the collar 23 is freely rotatable within the counterbore, but is retained against displacement therefrom.

A suitable lens 29 is mounted within the collar 23 and is supported on an inwardly extending annular flange 30 which is integral with the lower portion of the collar. The lens may be fastened within the collar in any suitable manner. A radial hair line 31 extends from the center of the lens to one edge thereof (Fig. 4), while an indicator line 32 is formed on the upper surface of the outwardly extending flange 24 of the collar, said indicating line being a continuation of the hair line and being disposed exactly 180° from, or exactly diametrically opposite, the outer end of the hair line 31. Obviously, since the indicating line 32, as well as the hair line 31, are formed on the rotatable collar 23, it is obvious that the position of these lines, with respect to the indications on the compass dial 21, may be readily varied.

The device is adapted for use in correlating the indication on an indicating medium, which indication has been made within the well bore, with the point of the compass, whereby the azimuthal position of the indication on such medium may be determined at the surface. The particular medium with which the instrument is employed is clearly shown in Figure 7 and comprises a disk 33 which has a single dot or other mark 34 thereon. This dot or mark is representative of the low side of the well bore and may be made or imprinted on the disk 33 in any suitable manner. For the purpose of explanation, reference is made to Figures 1 and 2, wherein an instrument for forming the single dot or indication 34 on the disk, is illustrated. This instrument forms no part of the present invention and is more fully described in my co-pending application, Serial No. 333,323, filed May 4, 1940.

The recording instrument, shown in Figures 1 and 2, is adapted to survey a well bore to determine the inclination, and direction of inclination of said bore. This recording instrument includes a casing 35 which is provided with an electric lamp 36 supplied with current by batteries 37. Immediately below the lamp 36, a plumb bob 38 is suspended within the casing and carries suitable lenses 39 which project the light rays from the lamp 36 downwardly below said plumb bob. The indicating disk 33 is mounted within a magnetic compass element 40, which is supported on a suitable shaft 41. The shaft is mounted within a plug 42 which is threaded into the lower end of the casing 35. The magnetic compass 40 includes the usual magnet 43 and this magnet is attracted or controlled by the magnetic influence of the earth, whereby the compass 40, as well as the disk 33 carried thereby, assumes a predetermined position within the well bore.

The disk 33 is preferably constructed of a printing out paper, whereby when light rays are concentrated on a given point on the disk, that portion which is exposed to the light rays is printed out, thereby forming a mark or indication on the disk. It is apparent that the plumb bob 38 will remain vertical and will thus assume a position out of alinement with the axis of the instrument, in accordance with the inclination of the instrument, which inclination is of course controlled by the inclination of the well bore. Thus, when the instrument is in a true vertical position, the plumb bob is vertically suspended so that the light rays from the lamp 36 are concentrated on the exact center of the disk 33. However, any variation from the vertical of the outer casing 35, will result in the light rays being concentrated on a point of the disk 33, which point is off center of said disk. The number of degrees which such point is off center of said disk, indicates the number of degrees of inclination of the well bore. Since the disk is mounted in the magnetic compass 40, said disk will always be maintained in a predetermined azimuthal position, as controlled by the magnetic influence of the earth. Therefore, when the recording instrument is lowered into the well bore and the electric lamp 36 is illuminated to project light rays onto the disk 33, a portion of the disk is exposed or "printed out" to form the mark or indication 34. This point or indication 34 indicates the number of degrees of inclination but does not indicate the direction of the inclination of the well bore and it is for this purpose, that the reading device, shown in Figures 3 to 6, is provided. Of course, as has been pointed out, the indication 34, which is in effect, representative of the low side of the well bore may be formed on the disk 33 in any desired manner and the invention is not to be limited to forming an indication by means of the instrument shown in Figures 1 and 2.

In using the reading device to determine the azimuthal position of the indication 34 so as to ascertain the direction of inclination of the well bore, the disk 33, together with the compass 40 which supports said disk is inserted within the axial opening 11 of the circular block or body 10 of the reading device. As explained, the magnetic compass, which carries the disk 33, is mounted on a shaft which is supported within the removable plug 42 and in inserting the disk within the reading device, it is preferable that the plug 42 be threaded into the opening 11 of the block 10, as is clearly shown in Figure 3. When the plug is threaded into the block, the magnetic compass 40 is disposed within the opening 11 below the lens 29 and the magnet 43 of the compass element 40 is acted upon by the magnetic influence of the magnets 17 and 18 which are disposed within the body 10. The magnetic element 18 is representative of azimuthal north and therefore causes the disk 33 and compass element 40 to rotate or to be oriented to a predetermined position within the device. When the compass 40 and disk 33 were located within the well bore, the magnet 43 of the compass was acted upon by the magnetic influence of the earth, whereby said disk was located in a predetermined position at the time that the indication 34 was made thereon. Through the disposition of the magnets 17 and 18, it will be obvious that the disk is caused to assume substantially the same relative position with respect to the magnet 18, as said disk assumed within the well bore with respect to true azimuthal north.

The location of the disk 33 within the body 10 of the reading device makes the upper surface of said disk clearly visible through the lens 29 which is carried by the rotatable collar 23. In taking the reading, it is only necessary to rotate the collar 23 until the hair line 31 on the lens 29 is alined with the indication 34 on said disk, as is clearly shown in Figure 4. The magnetic element 18 which is representative of north is vertically alined with the north point on the compass dial 21 and therefore, when the hair line 31 is alined with the indication 34 on the disk, it is known that the number of degrees between the outer portion of the hair line 31 and the point north denotes the azimuthal position of the low side of the well bore. In order to determine the direction of inclination of the well bore, which inclination is 180° from the low side of the hole, it is only necessary to note the position of the indicator line 32 after the hair line 31 is alined with the indication 34. As shown in Figure 4, the indicator line is disposed in a position reading south twenty east, which is the direction of inclination of the well bore.

The reading device is very simple in construction and provides for an instantaneous and accurate reading as taken from the indication 34 on the disk 33. No developing of any film is required and the indication 34 on the disk 33, which is representative of the azimuthal position of the low side of the hole, may be formed on said disk in any suitable manner. The disk is carried by a magnetic compass element, whereby at the time that the indication 34 is made, said disk is in a predetermined position with respect to true azimuthal north. The reading device is designed so that the disk 33 and its compass element 40 is caused to assume the same position within the device with respect to the magnetic element 18, as said disk had assumed with respect to magnetic north. When this is done, it is possible to manipulate the collar 23 and thereby obtain a direct reading on the compass dial 21 to denote not only the azimuthal position in degrees of the low side of the hole, but also the direction of inclination of the well bore.

The reading device shown in Figures 3 to 6 is adapted for use in interpreting or indicating the azimuthal position of the indication 34 on the disk 33, whereby the direction of inclination of the well bore may be determined. Thus, this device is particularly adapted for use in making well surveys. There are various orienting methods, wherein an indication 34 is formed on an indicating medium or disk 33, which is employed for the purpose of orienting tools within the well bore. In such orienting methods, the modified form of reading device, which is shown in Figs. 9 to 13 is used, such device being employed in place of the device shown in Figures 3 to 6. This reading device includes a circular block or body 50 which is provided with an axial opening 51, such opening being counter-bored or enlarged at 52 to provide an internal annular shoulder 53. Below the shoulder 53, the opening 51 is screw-threaded, as illustrated at 54, and below the screw-threaded portion, said opening is enlarged to provide a second internal shoulder 55 within the block.

The body 50 has a pair of diametrically opposed cavities or recesses 56 and a pair of magnetic elements 57 and 58 are mounted within these recesses. A collar or ring 59 encircles the periphery of the body 50 and this ring has an inwardly directed, annular flange 60 at its upper end, said flange engaging within a recess 61 formed in the upper peripheral portion of the body, whereby the ring or collar 59 is rotatably mounted or supported on said body. As an additional support and guide for the ring 59, a pin 62 is threaded through the lower portion of the ring and has its inner end engaging within an annular groove 63 which is provided in the outer surface of the body (Fig. 11).

The ring 59 is representative of the tool which is to be oriented, as for example, a whipstock, and said ring has a suitable mark M (Fig. 10) thereon, which mark is representative of the angular face of said whipstock. Obviously, the ring may be adjusted to various positions on the circular block 50 so as to change the radial position of the mark M relative to said block. The underside of the body or block 50 carries a suitable dial 64 which has graduations thereon which indicate degrees from zero to 180. The zero indication is vertically alined with the magnetic element 58, while the 180 indication is alined with the other magnetic element 57. The purpose of the rotatable ring, together with the dial 64 will be hereinafter explained.

For locking the ring 59 in various positions on the block or body 50 so as to prevent rotation of these parts after an adjustment of said ring has been made, a friction lock pin 65 is provided. This pin (Fig. 12) is mounted within a lateral opening or passage 66 formed in the block 50 and has its inner end bevelled. This bevelled end is adapted to be engaged by the bevelled upper end of a vertically extending, locking screw 67, which is threaded within a suitable opening 68 formed in the body 50. The outer end of the adjusting screw has a suitable head 69 made integral therewith, whereby manual manipulation of the screw 67 is facilitated. It will be obvious that when the screw 67 is rotated to move the same upwardly within the block, the bevelled inner end of said screw coacts with the bevelled inner end of the locking pin 65 to move the latter pin outwardly into engagement with the inner surface of the ring 59. By tightening the screw 67, a frictional engagement between the pin 65 and the ring 59 is set up, whereby rotation of said ring relative to the body 50 is impossible.

A compass rose or dial ring 70 overlies the upper surface of the block or body 50 and is mounted within a suitable recess provided therefor. The dial ring is rotatable within the recess and is confined against upward displacement by an annular flange 71 which is formed on a rotatable collar 72, the latter collar being rotatably mounted within the counterbore 52 of the block. The collar 72 is substantially the same in construction as the collar 23 of the first form and includes a lens 73 which is provided with a hair line 74. The flange 71 of the collar has an indicator line 75, similar to the indicating line 32 of the collar 23. The rotatable collar 72 is held against upward displacement from the counterbore 52 by means of a spring-pressed pin 76, which is substantially the same in construction as the retaining pin 26 of the first form. The pin 76 is mounted within a suitable radial opening 77, formed in the block 50. The dial ring 70 is substantially the same as the dial ring 21 of the first form and displays the four points of the compass, north, east, south and west. The spaces between each compass point are, of course, graduated or divided into degrees.

As has been explained, this reading device, shown in Figures 9 to 13, is adapted for use with records made in orienting methods. The disk or indicating medium which is insertable within the reading device is identical with the disk 33 shown in Figure 7. However, in orienting methods the indication 34 is made by means of a different type of recording instrument and such instrument is briefly illustrated in Figure 8. This instrument forms no part of the present invention and is more fully described in my co-pending application, Serial No. 308,801, filed December 12, 1939. As shown, a sub 80 is attached to the lower end of a drill stem 81 and this sub is provided with magnets 82 and 83 which are disposed diametrically opposite each other. The magnet 82 is comparable to the magnet 57 of the reading device, while the magnet 83 is comparable to the magnet 58 of said device. A whipstock or tool 84 is suitably secured to the sub in a known relation relative to the magnets 82 and 83. As shown, the whipstock 84 is secured to the sub so that its angular face 85 is disposed in vertical alinement with the magnet 82. The instrument I which carries the disk 33 is lowered into the sub and said disk is carried by a magnetized disk 86 (Fig. 11). The magnetized member 86 which carries the disk 33 is lowered substantially opposite the magnets 82 and 83 so as to be affected by the magnetic influences thereof so as to assume a predetermined position within said sub. Therefore, when the indication 34 is made on the disk 33, it is known that said indication is in a predetermined position with respect to the magnets 82 and 83 of the sub. It is noted that this is one type of instrument which can be employed in forming the indication on the disk for subsequent analysis in the reading device, but of course, the invention is not to be limited to this particular arrangement. The indication on the disk 33 may be made in any suitable manner.

After the indication 34 has been formed on the disk 33, said disk, together with its magnetized disk 86 is inserted within the block 50 in the manner shown in Figure 11, whereby the face of the indicating disk is clearly visible through the lens 73. The block 50 is representative of the sub 80, while the magnets 57 and 58 represent the magnets 82 and 83 within said sub. The ring 59 which surrounds the block is representative of the whipstock 84, while the mark M on said ring represents the face 85 of said whipstock. The ring 59 is adjusted so as to dispose the mark M in the same position with respect to the block 50 that the face of the whipstock bears with relation to the magnets. As illustrated, the face 85 of the whipstock is vertically alined with the magnet 82 and therefore, the ring is adjusted, as shown in Figure 10, to aline the mark M with the magnet 57 which represents the magnet 82.

It is obvious that when the magnetic carrier 86, together with the disk 33 is inserted within the block 50, the magnetic carrier immediately comes under the influence of the magnets 57 and 58 and is oriented or assumes the same position within the block, as it had assumed within the sub 80. The collar 72 which carries the lens 73 is then rotated so as to accurately aline the hair line 74 with the indication 34 on the disk 33 and as explained, this indication is representative of the low side of the well bore. It follows then, that the indicating line 75 is representative of the direction of the well bore. A previous well survey is made in orienting methods so that the direction of inclination of the bore is known and assuming that such inclination was south twenty east, as has been described with respect to the first form, the dial ring 70 is rotated so as to dispose the reading south twenty east opposite the indicating line 75. After this is done, it is only necessary to note the position of the line M, which is representative of the face of the whipstock to determine the exact azimuthal position of said whipstock. As illustrated in Figure 9, the position of the whipstock face, as indicated by the line M is south sixty west.

From the above, it will be seen that both forms of the reading device employ the same principle and both forms are adapted to interpret or translate a single indication which appears on an indicating medium and which has been previously made within the bore of the well. In the first form shown in Figures 3 to 6, the disk 33 is mounted within an ordinary magnetic compass element which, when within the well bore, is controlled by the magnetic influence of the earth. In such case, the magnets 17 and 18 are representative of azimuthal north and south so as to permit the disk to be accurately read. In the form shown in Figures 9 to 13, the disk 33 is carried by a magnetized element 86 which has been caused to assume a predetermined position within a sub 80 during the forming of the indication on said disk. In this instance, the magnets 57 and 58 are representative of the magnets within the sub, so that the disk 33 assumes the same relative position within the reading device, as it assumed within the well bore. In both instances, the reading is instantaneous and is also accurate. There is no need for developing film, or for performing any auxiliary operation. It is only necessary to insert the disk 33 within the reading device and to rotate the collar 23 in the first form and collar 72 in the second form, to properly aline the indication 34 with the hair line of said collar. Any possibility of error is obviated because the device is arranged so that the compass dial is immediately adjacent the indicating lines 32 and 75 respectively. Although two magnets have been shown as mounted in the reading device, it is pointed out that only a single magnet could be employed for obviously, a single magnet would be sufficient to effect rotation of the magnetized elements which carry the disk 33 to a proper position. It is noted that magnets are illustrated as the means for orienting the indicating medium, that is, the compass element or the disk, within the reader but other means, such as for example, a pin and orienting slot could be employed for this purpose.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. The combination with an indicating element which has an indication thereon and which is subject to magnetic influence, of a reading device including, a body for receiving the element, magnetic means within the body for causing the element to assume a predetermined position within said body, and an indicating dial on the body for correlating the position of the indication on the element with azimuthal north to determine the azimuthal position of said indication.

2. The combination with an indication medium having an indication thereon of a reading device including, a body having means for receiving said medium, means within the body co-acting with the medium for causing the medium to assume a predetermined position within said body, and an indicating dial on said body for correlating the indication on said medium with azimuthal north to ascertain the azimuthal position of the indication on said medium.

3. The combination with an element which has an indication thereon and which is subject to magnetic influence of a reading device including, a body having an axial opening for receiving the element, magnetic means within the body for acting on the element to move said element to a predetermined position within the body, and a compass rose surrounding the opening within which the element is disposed for determining the azimuthal position of the indication on the element, as shown by the compass points on said compass rose.

4. A device, of the character described, for receiving a disk having a single indication thereon which indication is representative of the low side of a well bore, said device including, a body having an axial opening therein, means for removably mounting the disk within the opening, means within the body adjacent the opening for automatically causing the disk to assume a predetermined position within said body upon insertion of the disk into said body, and an indicating dial on the exterior of the body surrounding the opening, whereby the azimuthal position of the indication on the disk may be ascertained.

5. A device, of the character described, for receiving a disk having a single indication thereon which indication is representative of the low side of a well bore, said device including, a body having an axial opening therein, means for removably mounting the disk within the opening, means within the body adjacent the opening for automatically causing the disk to assume a predetermined position within said body upon insertion of the disk into said body, a compass rose on the exterior of the body surrounding the opening, and rotatable means within the opening above the disk and having means for accurately alining the indication on the disk with a point on the compass, whereby an accurate determination of the exact azimuthal position of the indication on said disk may be obtained.

6. A device, of the character described for receiving an indicating disk having a single indication thereon which indication is representative of the low side of a well bore, said device including, a body having an axial opening therein, means for removably mounting the disk within the opening, magnetic means within the body representative of azimuthal north for causing the disk to assume the same position relative to the magnetic means as it assumed with respect to azimuthal north when subjected to the magnetic influence of the earth, and a compass rose on the exterior surface of the body and bearing a know relation to the magnetic means, whereby a correlation of the indication on the disk with the dial indicates the azimuthal position of such indication to denote the azimuthal position of the well bore in which the indication was made.

7. A device, of the character described, including, a body having an axial opening therein, a pair of diametrically opposed magnets within the body for acting upon a metallic element within the body to cause said element to assume a predetermined position therein, an indicating dial secured to the upper surface of the body and having a central opening alined with the opening in the body, and a rotatable member mounted within the registering openings and having a transparent portion, whereby the element which is inserted within the body is visible therethrough.

8. A device, of the character described, including, a body having an axial opening therein, a pair of diametrically opposed magnets within the body for acting upon a metallic element within the body to cause said element to assume a predetermined position therein, a compass rose secured to the upper surface of the body and having a central opening alined with the opening in the body, a rotatable member mounted within the registering openings and having a transparent portion, whereby the element which is inserted within the body is visible therethrough, an annular flange on said rotatable member overlying the inner periphery of the compass rose, a radial line extending from the center to the outer edge of the transparent portion of the member, and an indicating line on the flange of said member and disposed 180 degrees from the outer end of the radial line.

9. A device, of the character described for determining the azimuthal position of an indication on an indicating disk which is subject to magnetic influence, said device including, a body having an axial opening for receiving the disk, a magnet within the body for causing the disk to assume a predetermined position within the body, and a compass rose rotatably mounted on the body surrounding the opening and disk, said compass rose bearing a known relation to the magnet, whereby the azimuthal position of the indication on the disk may be determined by the position of the indication with respect to the compass rose.

10. A device, of the character described, for determining the azimuthal position of an indication on an indicating disk which is subject to magnetic influence, said device including, a body having an axial opening for receiving the disk, a magnet within the body for causing the disk to assume a predetermined position within the body, an indicating dial rotatably mounted on the body surrounding the opening and disk, said dial bearing a known relation to the magnet, whereby the azimuthal position of the indication on the disk may be determined by the position of the indication with respect to the dial, a ring rotatably mounted on the body and having a mark thereon which is representative of a tool to be oriented in the well bore in which the record is made, whereby the position of the mark with respect to the position of the indication on said disk denotes the azimuthal position of the tool which said mark represents.

11. A device, of the character described, for determining the azimuthal position of an indication on a disk which is subject to magnetic influence, said device including, a body having an axial opening for receiving the disk, a magnet within the body for causing the disk to assume a predetermined position within the body, a compass dial rotatably mounted on the body surrounding the opening and disk, said dial bearing a known relation to the magnet, a rotatable member mounted within the opening of the body and having a transparent portion through which the disk within the opening is visible, means on said transparent portion for radially alining the indication on the disk with a point on the compass dial to indicate the azimuthal position of the disk, a ring rotatably mounted on the body and having a mark thereon which is representative of a tool to be oriented in the well bore in which the record is made, whereby the position of the mark with respect to the position of the indication on said disk denotes the azimuthal position of the tool which said mark represents.

12. A device, of the character described, for determining the azimuthal position of an indication on an indicating disk which is subject to magnetic influence, said device including, a body having an axial opening for receiving the disk, means within the body for causing the disk to assume a predetermined position within the body, an indicating dial rotatably mounted on the body surrounding the opening and disk, said dial bearing a known relation to the means which causes the disk to assume its predetermined position in the body, whereby the azimuthal position of the indication on the disk may be determined by the position of the indication with respect to the dial, a ring rotatably mounted on the body and having a mark thereon which is representative of a tool to be oriented in the well bore in which the record is made, whereby the position of the mark with respect to the position of the indication on said disk denotes the azimuthal position of the tool which said mark represents.

13. A device, of the character described, for receiving an indicating medium having an indication thereon, said device including, a body having an axial opening therein, means within the body adapted to co-act with the medium when the medium is inserted within the opening of the body for causing the medium to assume a predetermined position relative to the body, and an indicating dial on the exterior of the body and correlated with the aforementioned means within the body, whereby the azimuthal position of the indication on the medium as indicated by the dial may be ascertained.

LEONIDAS C. MILLER.